(12) United States Patent
Ananthamurthy et al.

(10) Patent No.: US 7,831,768 B2
(45) Date of Patent: Nov. 9, 2010

(54) METHOD AND APPARATUS FOR WRITING DATA TO A DISK ARRAY

(75) Inventors: Srikanth Ananthamurthy, Bangalore (IN); Aaron Lindemann, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 464 days.

(21) Appl. No.: 11/928,237

(22) Filed: Oct. 30, 2007

(65) Prior Publication Data

US 2008/0109602 A1    May 8, 2008

(30) Foreign Application Priority Data

Nov. 3, 2006    (IN)    ............... 2036/CHE/2006

(51) Int. Cl.
*G06F 12/00* (2006.01)

(52) U.S. Cl. ............... 711/114; 711/159; 711/E12.001; 711/E12.075

(58) Field of Classification Search ............ None
See application file for complete search history.

(56) References Cited

U.S. PATENT DOCUMENTS 7,096,316 B1 *    8/2006    Karr et al. .............. 711/114

* cited by examiner

*Primary Examiner*—Reginald G Bragdon
*Assistant Examiner*—Eric Loonan

(57) ABSTRACT

A method for writing data to a RAID 5 configuration of hard disks writes two or more items of data to a data stripe together. The method includes the determining of the suitability of data items to be written together, the storing of the new data items to temporary buffers, the reading of the original data and parity from the hard disk to the temporary buffers, the modification of the parity and the writing of the new data and new parity to the hard disks.

19 Claims, 9 Drawing Sheets

US 7,831,768 B2

METHOD AND APPARATUS FOR WRITING DATA TO A DISK ARRAY

RELATED APPLICATIONS

The present application is based on, and claims priority from, Indian Application Ser. No. 2036/CHE/2006, filed Nov. 3, 2006, the disclosure of which is hereby incorporated by reference herein in its entirety.

BACKGROUND

The acronym RAID (originally redundant array of inexpensive disks, now also known as redundant array of independent disks) refers to a data storage scheme using multiple hard disks to share or replicate data among the disks. Depending on the level chosen, the benefit of RAID is that it increases one or more of data integrity, fault-tolerance, throughput or capacity, when compared to single disks.

There are various RAID configurations, which protect data against disk failure in two main ways. The first of these is mirroring, in which a whole disk is set aside to store a copy of the data on another disk. The second is the use of parity information.

RAID 5 is a method of storing data on disk arrays and involves striping data across the disks in the array. A RAID 5 system maintains parity information for the data and stores it in a stripe to provide data redundancy and to provide the ability to withstand the failure of one disk in the array. The parity information is calculated based on the data stored in the stripe. Every time the data is updated, the parity information also needs to be updated to keep it synchronised with the data.

The number of disks in the array is referred to as the stripe length or stripe width. The amount of data (including parity) that can be stored in a stripe is referred to as the stripe size. The portion of a disk that belongs to one stripe is referred to as a chunk. Each chunk is further divided into a number of logical block addresses (LBAs).

The number of disks in a stripe varies between disk arrays. The stripe width may also be less than the number of disks in the array. For example, the array may have 10 disks, with a stripe width of 5 disks.

The operation of reading or writing to a disk is referred to as an input/output (I/O) operation.

The Read-Modify-Write (RMW) method is one of the methods used in writing data to a RAID 5 system. When data is to be written to a chunk in a RAID 5 system, the RMW method updates the data to the appropriate chunk and also updates the parity chunk to reflect the change.

For example, for a RAID 5 array with 5 disks, a single stripe comprises four data chunks (D1, D2, D3 and D4) and one parity chunk (P). Writing new data (D1') onto this stripe involves the following steps:
Read old data D1 and store in a temporary buffer;
Read old parity information P and store in a temporary buffer;
Calculate intermediate parity Pi=P⊕D1 and store it in a temporary buffer;
Calculate new parity information P'=Pi⊕D1' and store it in a temporary buffer;
Write new parity information P';
Write new data D1',
where the symbol ⊕ represents an exclusive OR logical operation, also denoted herein by XOR.

Therefore, the RMW process for a single write requires 4 I/O operations (2 reads and 2 writes) and 2 parity calculations.

In general therefore, for a RAID 5 array having N disks, with a stripe width of N, a single stripe can accommodate a maximum of N−1 data write operations, where a stripe has N−1 data chunks and 1 parity chunk. To accomplish these writes, the RMW algorithm requires 4(N−1) I/O operations and 2(N−1) parity calculations.

The present RMW technique is therefore I/O intensive and is one of the main performance bottlenecks in a RAID 5 system.

BRIEF DESCRIPTION OF THE DRAWINGS

Embodiments of the invention will now be described by way of example with reference to the accompanying drawings, in which.

DETAILED DESCRIPTION

Figure 1:
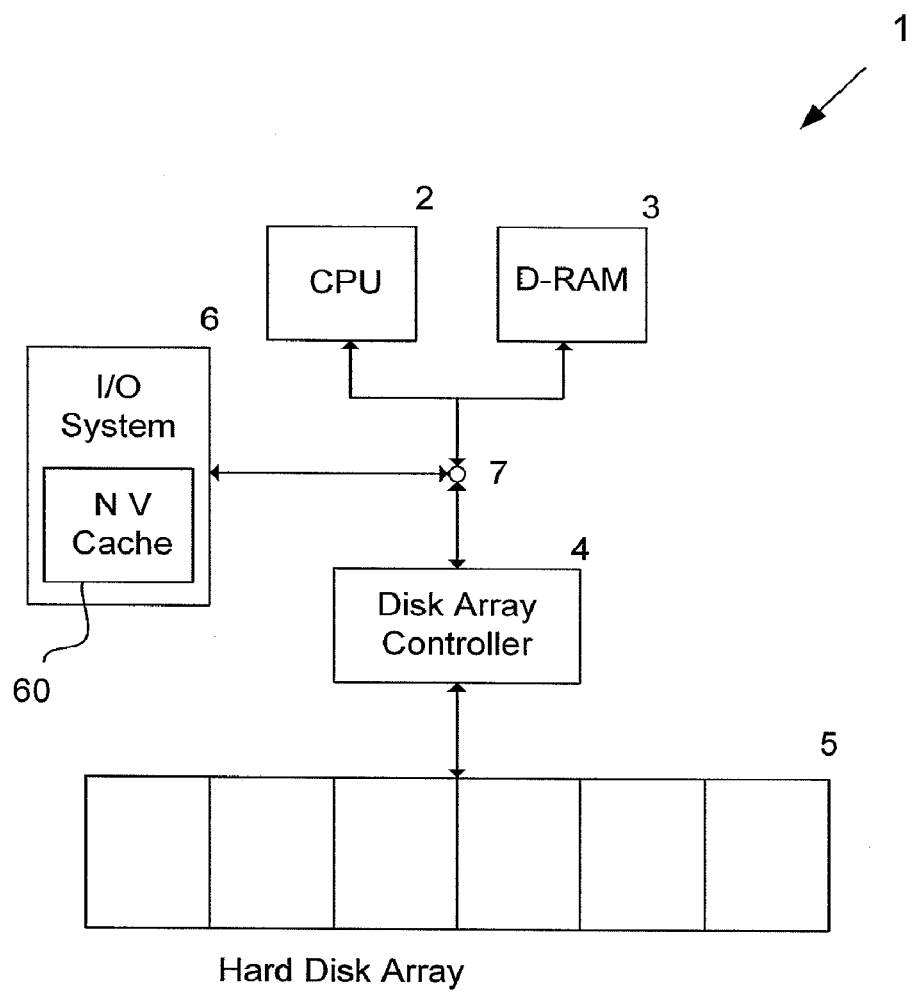
FIG. 1 is a schematic diagram of a conventional multiprocessor system.

FIG. 1 is a schematic diagram of a conventional computer system 1 comprising one or more central processing units 2, main memory 3, for example in the form of dynamic RAM, a disk array controller 4, connected to a plurality of hard disks 5, and an I/O system 6 including a non-volatile memory cache 60, all interconnected by a bus 7.

Figure 2:
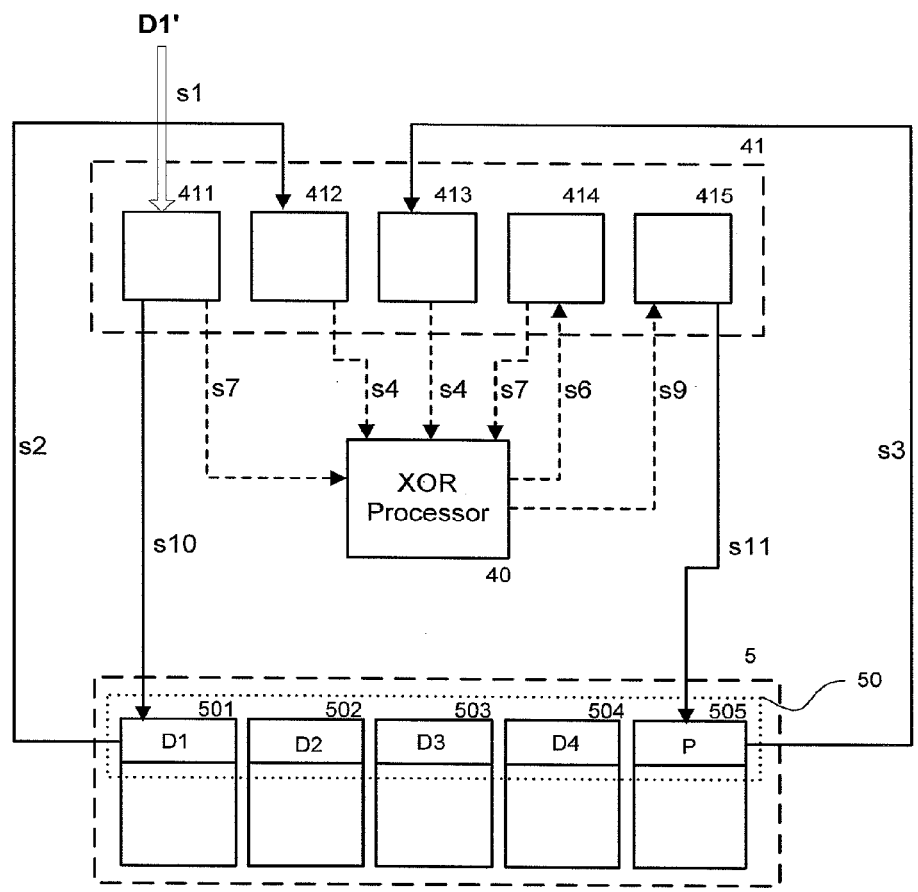
FIG. 2 is a schematic diagram of a system for writing data to disks in a RAID 5 configuration.
Figure 3:
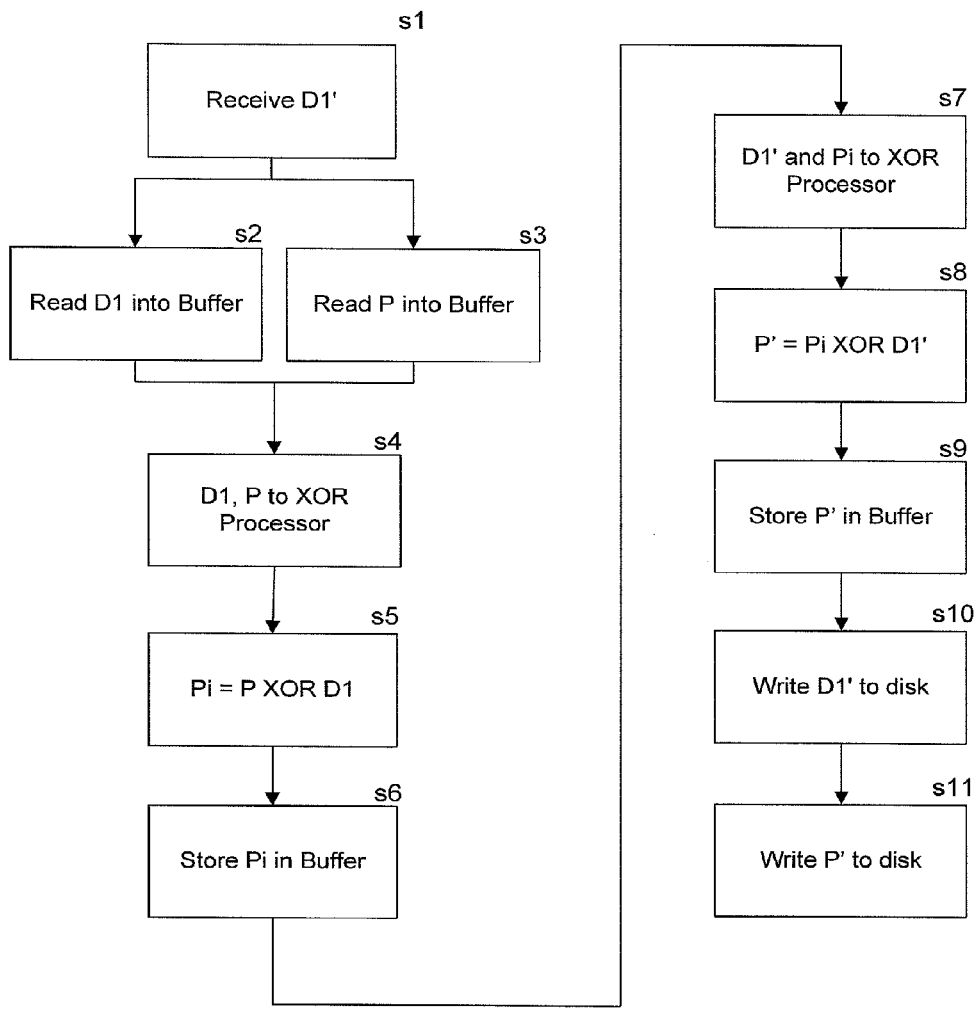
FIG. 3 is a flow diagram illustrating of method of writing data to disks in the system of FIG. 2.

FIGS. 2 and 3 illustrate a write operation as performed in a conventional RAID 5 system. The system comprises an array of five hard disks 5, an XOR logical processor 40 and a plurality of temporary buffers 41. A stripe 50 is written across the five hard disks and each hard disk contains one chunk, with first to fifth chunks 501, 502, 503, 504 and 505 containing data D1, D2, D3, D4 and parity, P respectively. The plurality of temporary buffers contain first to fifth buffers 411, 412, 413, 414 and 415.

In an example where a single data item (D1') needs to be written to the disk stripe 50, the conventional Read-Write-Modify process is described below.

The data to be written (D1') is received and is stored in a first temporary buffer 411 (step s1). The old data D1 is read (step s2) from a first chunk 501 to a second temporary buffer 412 and the old parity information (P) is read from a fifth chunk 505 to a third temporary buffer 413 (step s3).

The old data (D1) and the old parity information (P) are then passed from temporary buffers 412 and 413 to the XOR processor 40 (step s4), where the XOR calculation Pi=P⊕D1 is performed (step s5). The result, the intermediate parity information Pi, is passed to the fourth temporary buffer 414 for storage (step s6).

The intermediate parity information (Pi) and the new data (D1') are passed from fourth and first temporary buffers 414 and 411 to the XOR processor (step s7) for the XOR calculation P'=Pi⊕D1' (step s8). The new parity information (P') is then stored in the fifth temporary buffer 415 (step s9). Finally the new data (D1') is written from the first temporary buffer 411 to the first chunk 501 (step s10) and the new parity information (P') is written from the fifth temporary buffer 415 to the fifth chunk 505 (step s11).

Figure 4:
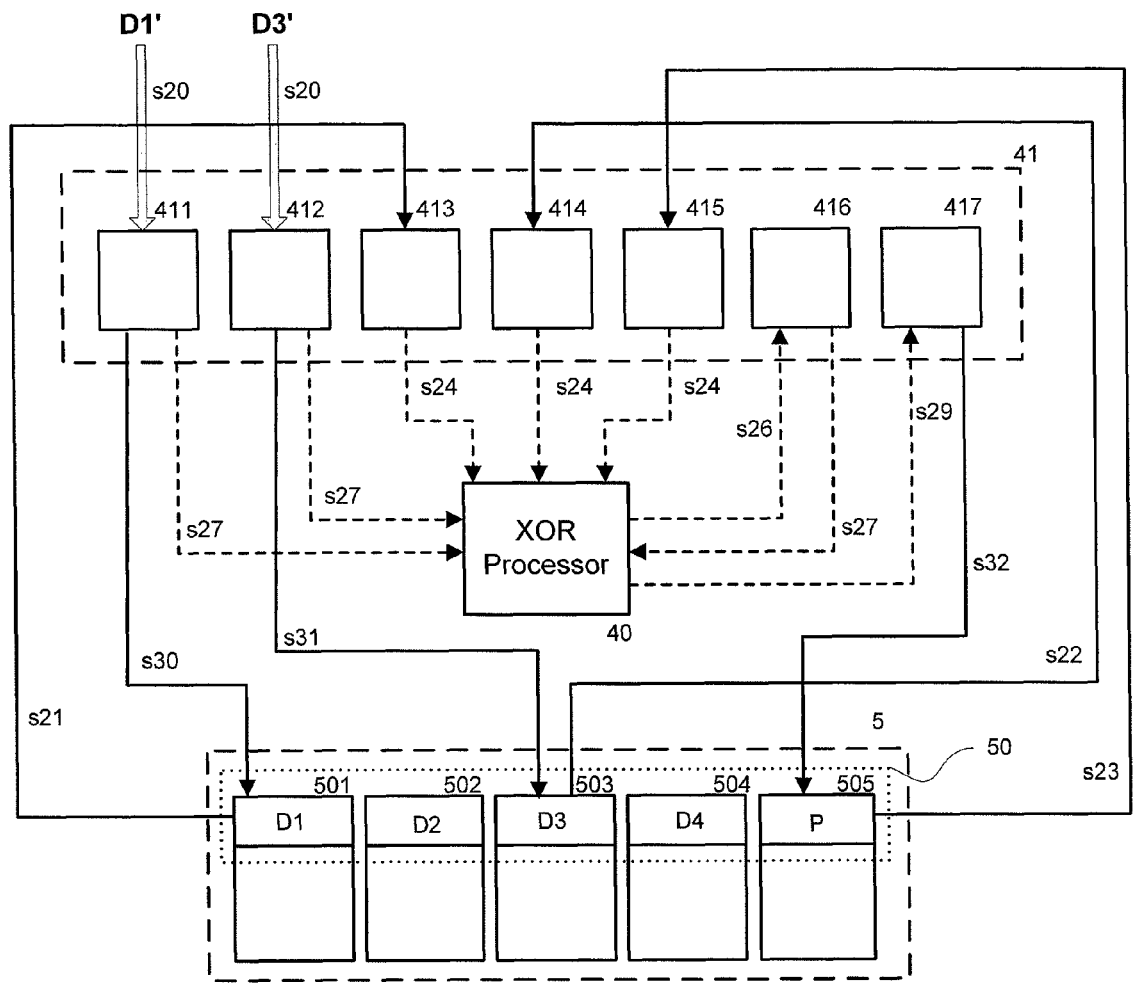
FIG. 4 is a schematic diagram of a method for writing data to disks in a RAID 5 configuration according to the invention.
Figure 5:
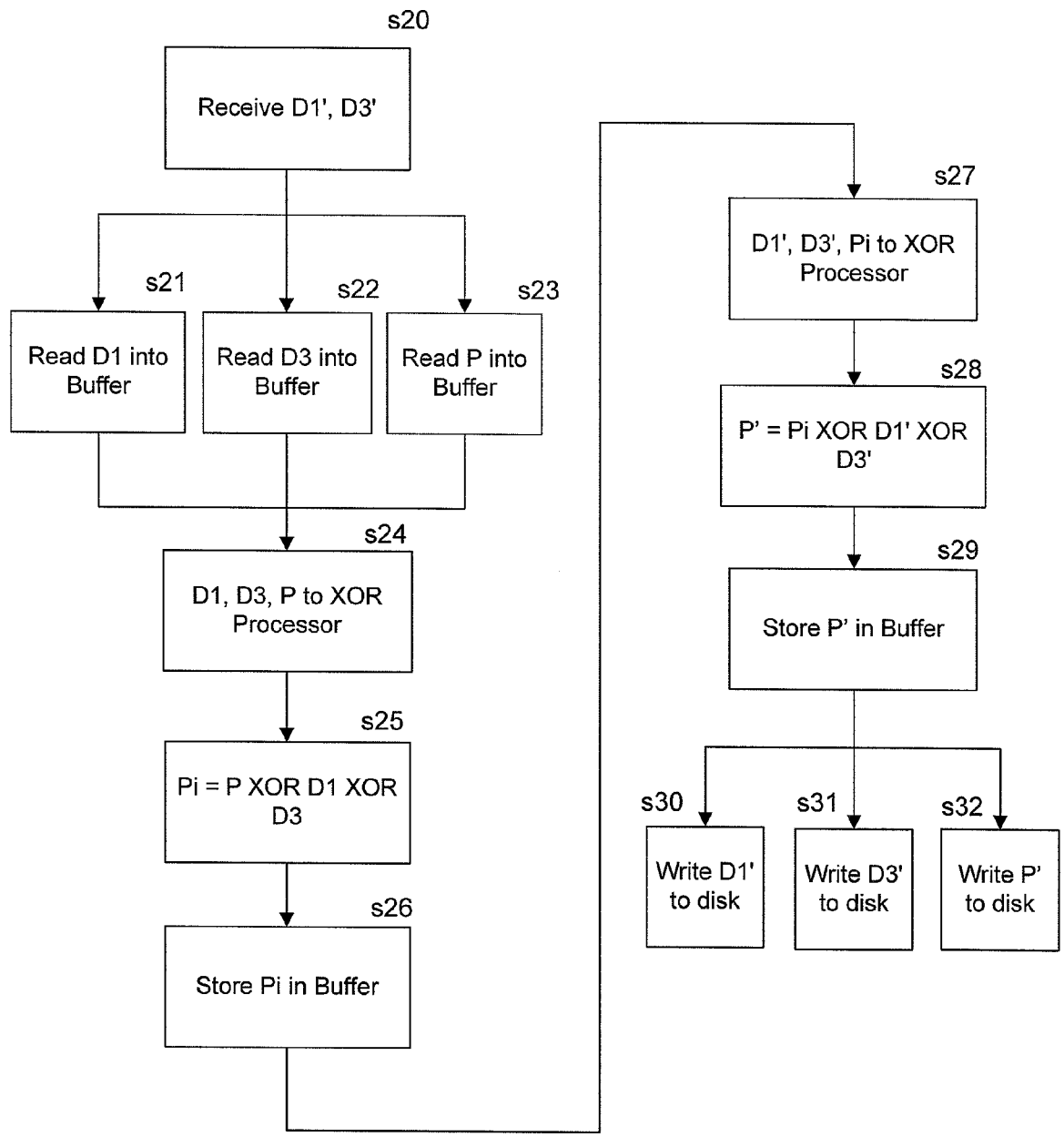
FIG. 5 is a flow diagram illustrating of method of writing data to disks in the system of FIG. 4.

FIGS. 4 and 5 illustrate a write operation according to the invention, which is referred to herein as the RMW_variant. The components shown in FIG. 4 are similar to those shown in FIG. 2, except seven buffers are present (411-417) instead of five.

In this example, two items of data (D1' and D3') are to be written to the disk stripe. The conventional method would require 8 I/O operations and 4 parity calculations. In a system according to the invention, the two writes are combined into a single operation, as described below.

The two items of data (D1', D3') are received and stored in first and second temporary buffers 411 and 412 respectively (step s20). The old data (D1 and D3) is read from first chunk 501 and third chunk 503 respectively to temporary buffers 413 and 414 (steps s21, s22). The parity information (P) is read (step s23) from a fifth chunk 505 to a fifth temporary buffer 415. The ordering of steps in the flowchart does not necessarily imply that the steps are carried out in that order. For example, the reading of the parity information and data items can be carried out in any order.

The old data (D1 and D3) and the old parity information (P) are then passed from temporary buffers 413, 414 and 415 respectively (step s24), to the XOR processor 40 for the XOR calculation Pi=P⊕D1⊕D3 (step s25). The intermediate parity information (Pi) is passed (step s26) to a sixth temporary buffer 416 for storage.

The XOR processor 40 is capable of performing XOR operations on more than two blocks of data at a time. For example, in the case of two data writes being performed simultaneously, the XOR processor operates on 3 blocks.

The intermediate parity information (Pi) and the new data (D1' and D3') are passed from temporary buffers 416, 411 and 412 respectively to the XOR processor 40 (step s27) for the XOR calculation P'=Pi⊕3D1'⊕D3' (step s28). The new parity information (P') is then stored in a seventh temporary buffer 417 (step s29).

Finally the new data (D1' and D3') is written from the first and second temporary buffers 411 and 412 to the first and third chunks 501 and 503 (steps s30, s31), and the new parity information (P') is written from the seventh temporary buffer 417 to the fifth chunk 505 (step s32).

The operation therefore requires 3 reads, 3 writes and 2 parity calculations, saving a total of 2 I/O calculations and 2 parity calculations as compared with the conventional method.

Incoming data to be written to the array is usually stored in a non-volatile disk cache and is flushed to the disks periodically. When the data items in the cache are ready to be flushed to the disk stripes, the system according to the invention determines which items of data can be grouped together to be written to the same disk stripe.

Write operations to the same disk chunk cannot be mixed, and have be resolved at the cache level or performed serially. Write operations to different disk chunks in the same stripe can be mixed, whether or not these are to overlapping or non-overlapping logical block addresses (LBAs).

The modify phase requires allocation of non-volatile buffers (FIG. 4, 411-417) to hold the transient data. The buffers can vary in size.

Figure 6:
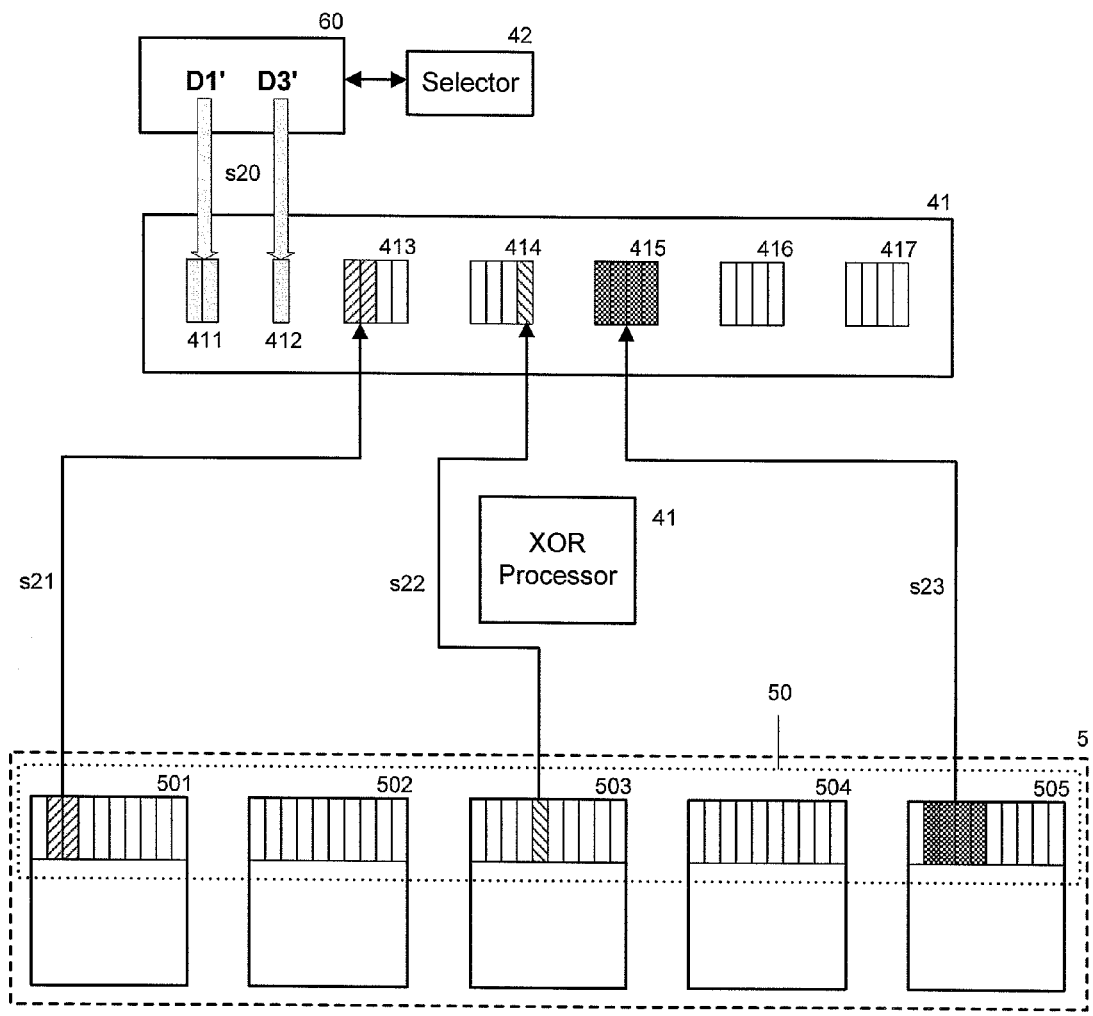
FIG. 6 is a schematic diagram showing the READ phase of the method of FIG. 5.
Figure 7:
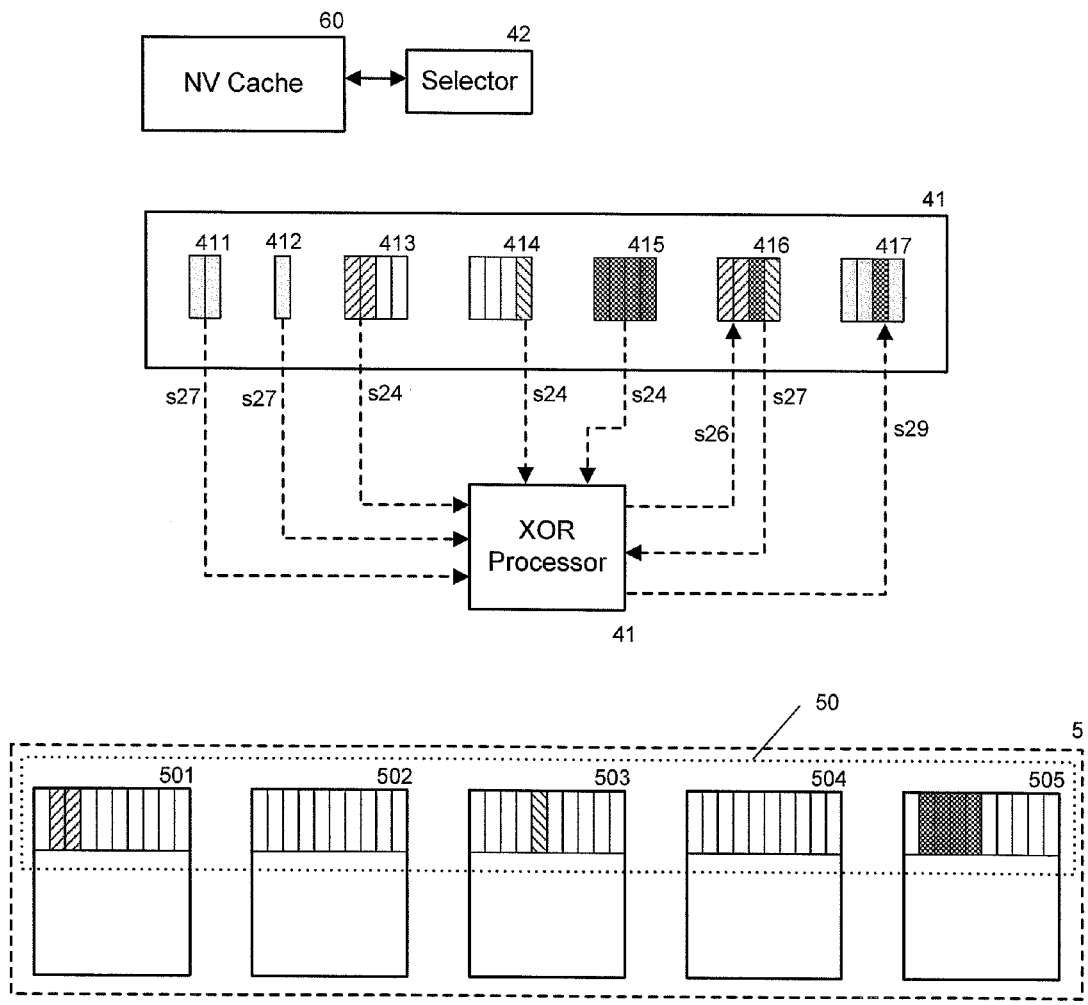
FIG. 7 is a schematic diagram showing the MODIFY phase of the method of FIG. 5.
Figure 8:
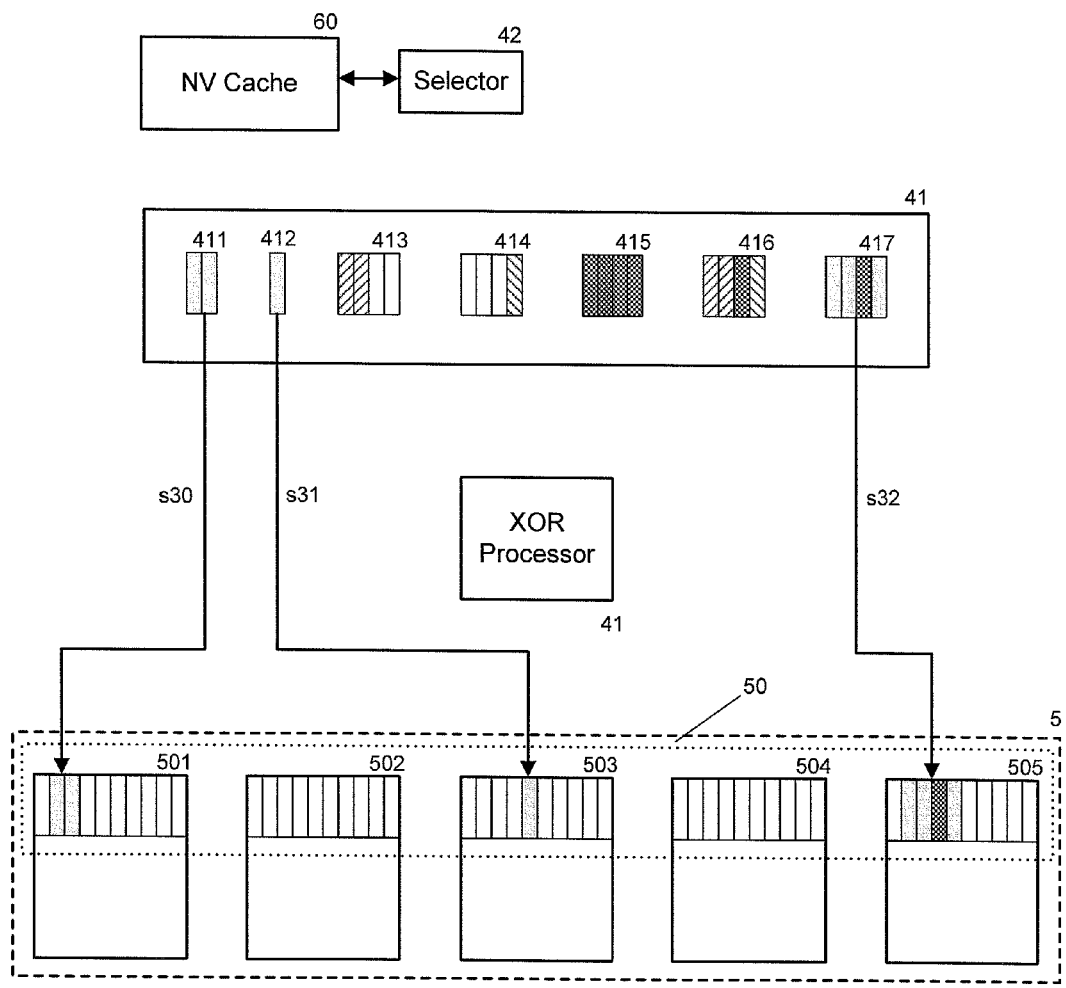
FIG. 8 is a schematic diagram showing the WRITE phase of the method of FIG. 5.

FIGS. 6 to 8 show the steps that take place during the three stages of the RMW_variant process for a disk stripe of 5 disks, with each chunk comprising disk LBAs 0 to 99. In these figures, the hard disk chunks (501-505) are each split into 10 sections, with each section representing 10 logical block addresses (LBAs). Therefore the sections shown in the drawings, from left to right, represent LBAs 0-9, 10-19, 20-29 and so on. Similarly, the first to seventh temporary buffers (411-417) are depicted in sections, with each corresponding to 10 LBAs.

All new data to be written is temporarily written to a non-volatile cache 60. A selector 42 groups the new data according to data items that can be simultaneously written to the same stripe. For example, the selector selects new data D1' and D3' to be written to stripe 50. D1' is to be written to LBA range 10 to 29 of chunk 501 (to replace the corresponding data of D1). D3' is to be written to LBA range 40 to 49 of chunk 503 (to replace corresponding data of D3). D1' is therefore transferred from the non-volatile cache 60 and written into the first buffer 411, having buffer size 20 and D3' is transferred from the non-volatile cache 60 and into the second buffer 412, having buffer size 10. In an alternative embodiment, data D1' and D3' are not copied into temporary buffers and remain in the non-volatile cache before being written to disk.

FIG. 6 shows the steps that occur during the Read phase. In this phase, the required size of the buffers is determined and the old data D1, D3 and parity information P is read (steps s21, s22 and s23 respectively) to three equal sized zero filled buffers (413, 414, and 415) of size 40 at LBA positions dependant on the origin of the data. The buffer size is equal to the size of the parity blocks that need to be read. In this example, the parity information P from LBAs 10 to 49 needs to be read to cover the range of the new data to be written. In general terms, the buffer size is calculated as the range of LBAs between the lowest LBA and the highest LBA relative to the start of the stripe on each drive. The method of setting the buffer size is described in more detail below with reference to FIG. 9.

Therefore:

LBA 10 to 29 of disk D1 is read into the first 20 blocks of buffer 413;

LBA 40 to 49 of disk D3 is read into the last 10 blocks of buffer 414;

LBA 10 to 49 of disk P is read into buffer 415.

FIG. 7 shows the steps that take place during the Modify phase. In this phase the intermediate parity information (Pi) is calculated by XORing the old data (D1 and D3) with the old parity information (P), the result of which is stored in the sixth buffer 416 (steps s24 to s26). The new parity information P' is calculated by XORing the intermediate parity information (Pi) with the new data (D1' and D3') and the result is stored in buffer 417 (steps s27 to s29). In an alternative embodiment, where the XOR buffers are required to be of the same size, new data D1' and D3' are copied from the first and second temporary buffers 411, 412, or non-volatile cache, into corresponding locations in the third and fourth buffers 413, 414. The XOR operation would then use the data in the third and fourth buffers 413, 414.

The parity buffers 415, 416 and 417 are each of block length 40 having data from LBA 10 to 49.

The LBA range 30 to 39 of the intermediate parity information (Pi) and the new parity information (P') buffers (416, 417) contain unchanged parity, which is read and written back. This is the penalty that is imposed by the RMW_variant method. The worst possible case, involving the above example, would be in the event that the two writes D1' and D3' are just 1 LBA in size, and come to addresses 0 and 99. In this event, the additional amount of parity that will be read and written back without modification will be 98 LBAs. This penalty can be minimised by ensuring the sizes of the chunks are small and by preventing significantly non-overlapping writes from happening simultaneously. For example, the maximum distance between two writes is determined and checked against a threshold. If the threshold is exceeded, the data is written serially using the conventional RMW method.

FIG. 8 shows the steps that occur during the Write phase. In this phase, first, second and seventh buffers 411, 412, 417 are written (steps s30, s31, s32) to the appropriate LBAs of chunks 501, 503, and 505 to replace the corresponding LBAs of the old data, D1 and D3, and the old parity information (P).

As mentioned above, embodiments of the invention can perform writes irrespective of whether the logical block addresses overlap. There are three types of overlapping write. The first type is when the two writes overlap completely, for example D1' comes to LBA range 10 to 29 in the first buffer 411 and D3' comes to LBA range 10 to 29 in the second buffer 412.

The range between the lowest and highest LBAs is 20, so the required buffer size is 20. The corresponding LBA's of D1, D3 and P are read into the third, fourth and fifth buffers 413, 414 and 415 respectively, of size 20.

The same parity calculations are carried out as in the example above, with the intermediate and final parity calculations being stored in sixth and seventh buffers 416 and 417 of size 20.

Finally, first, second and seventh buffers 411, 412 and 417, all of size 20, are written to LBA 10 to 29 of the first, second and fifth chunks 501, 503 and 505 respectively to replace corresponding LBAs of the old data D1, D3 and parity information P.

The second type of overlapping write is where one write is contained wholly within another.

For example, D1' comes to LBA range 0 to 35 of the first buffer 411 and D3' comes to LBA range 10 to 29 of the second buffer 412.

In this example, the range between the lowest LBA and the highest LBA is 36, so that the size of the buffers required for the Read phase is 36. The Read phase therefore involves the following steps:
LBA 0 to 35 of data D1 on the first chunk 501 is read into the third buffer 413;
LBA 10 to 29 of data D3 on the third chunk 503 is read into blocks 10 to 29 of the fourth buffer 414;
LBA 0 to 35 of parity information P on the fifth chunk 505 is read into the fifth buffer 415.

Since the third, fourth and fifth buffers are initially zero filled buffers, the fourth buffer will have data between LBAs 10 and 29, but blocks 0 to 9 will be zeroes, as will blocks 30 to 35.

The intermediate and new parity information are calculated as before and the Write phase involves:
Writing the first buffer 411 to LBA 0 to 35 of the first chunk 501;
Writing the second buffer 412 to LBA 10 to 29 of the third chunk 503;
Writing the seventh buffer 417 to LBA 0 to 35 of the fifth parity chunk 505.

The third type of overlapping write is where both writes have some common overlap and some distinct areas of their own.

For example, D1' comes to LBA range 10 to 35 in the first buffer 411 and D3' comes to LBA range 25 to 49 in the second buffer 412.

In this example, the size of the buffers required for the Read phase is (49−10)+1=40. The Read phase therefore involves the following steps:
LBA 10 to 35 of data D1 (on first chunk 501) is read into blocks 10 to 35 of the third buffer 413, leaving blocks 36 to 49 zero filled;
LBA 25 to 49 of data D3 (on third chunk 503) is read into blocks 25 to 49 of fourth buffer 414, leaving blocks 10 to 24 zero filled;
LBA 10 to 49 of parity information P (on fifth chunk 505) is read into the fifth buffer 415.

The intermediate and new parity information is calculated as before and the Write phase involves:
Writing the first buffer 411 (D1') to LBA 10 to 35 of the first chunk 50;
Writing the second buffer 412 (D3') to LBA 25 to 49 of the second chunk 503; and
Writing the seventh buffer 417 (P') to LBA 10 to 49 of the parity chunk 505.

In another embodiment, multiple writes to individual chunks can be performed simultaneously as long as the data items do not overlap. For example two new items of data (D1'*a* and D1'*b*) are to be written to data D1 on first chunk 501. Similarly, two new pieces of data (D3'*a* and D3'*b*) are to be written to data D3 on third chunk 503. D1'*a* and D1'*b* can be grouped, as can D3'*a* and D3'*b*. This provides the benefit of one contiguous read and one contiguous write for accessing data on each of D1 and D3 and P. This therefore further reduces the number of I/O's required during the writing of new data. The transfer time of the contiguous reads and writes will be increased because the method may be reading data that it does not actually require. However, a performance benefit is still obtained due to the time saving in the smaller number of I/Os performed.

For example:
D1'*a* is to be written to LBA 10-29 of the first chunk 501;
D1'*b* is to be written to LBA 50-59 of the first chunk 501;
D3'*a* is to be written to LBA 40-49 of the third chunk 503; and
D3'*b* is to be written to LBA 70-79 of the third chunk 503.

The corresponding reads (D1*a* and D1*b*, and D3*a* and D3*b*) are grouped together to form a read of D1 from LBAs 10-59, D3 from LBAs 40-79 and P from LBAs 10-79. This means that data read from D1 LBAs 30-49 and data from D3 LBAs 50-69 is surplus to requirements. However, the increased transfer time due to reading of this surplus data, is smaller than the time saved due to the smaller number of I/O operations required.

The 'holes' in the reads, D1 LBAs 30-49 and D3 LBAs 50-69 are filled in with zeros in the memory buffer. Once again, the time saving from grouping the writes greatly outweighs the extra instructions needed to populate the appropriate memory locations with zeroes. A variation on this is not to fill the holes with zeroes. New data D1'*a* and D1'*b* can then be copied into one contiguous buffer at the appropriate locations based on the LBA. This buffer is preferably the same one into which the old data was contiguously read. In this case, D1'*a* and D1'*b* can be written out in one write instead of two.

The RMW_variant procedure described above can also be extended to provide full stripe write performance when the amount of new data being written to a stripe is much greater than the number of 'holes'. This can be done by reading the holes and then performing a full stripe write. This is particularly beneficial in the case of localised random or almost sequential workloads, ie. workloads that are sequential with small holes, and therefore not fully contiguous. Localised random workloads are workloads that write to random locations in the same stripe, so hitting most, but not all the locations in the stripe. For example, a localised random workload may cover a group of I/Os such as 0-5, 87-99, 23-40, 44-86, 6-20, so covering the entire range 0-99, except for holes at 21-22 and 41-43. The method according to the invention can read the data in the holes, write this data to the corresponding locations in a buffer containing the new data and then perform a single full stripe write.

Figure 9:
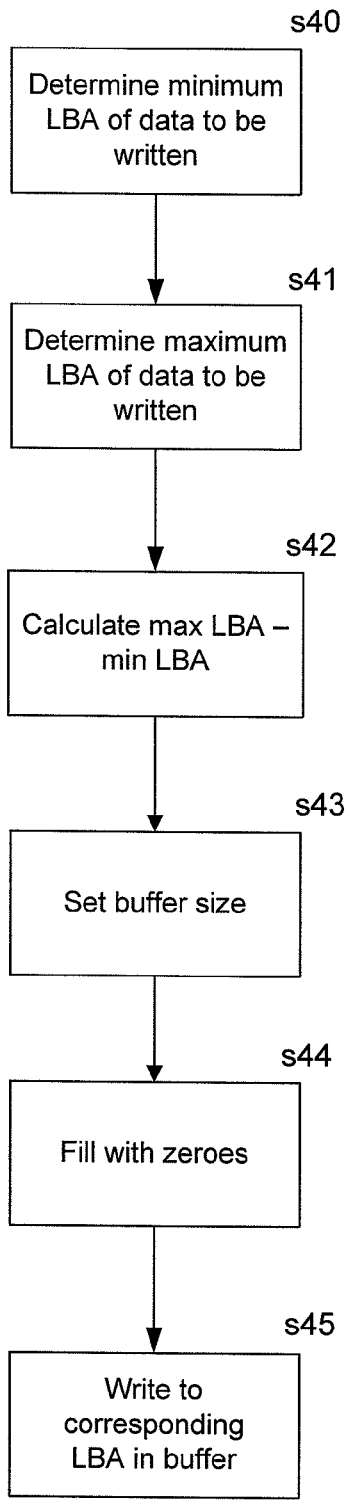
FIG. 9 is a flow diagram illustrating the processing of allocating a buffer size for use in a system according to the invention.

Referring to FIG. 9, the method of setting up the initial buffers comprises determining the minimum LBA of new data to be written (step s40), determining the maximum LBA of new data to be written (step s41) and calculating the difference between the minimum and maximum LBAs (step s42). The maximum and minimum LBAs are determined relative to the start of the stripe on each drive. For example, rather than using LBAs 0-99 on all disks, a RAID 5 system may, for example, use LBA 0-99 on D1, LBA 400-499 on D2, LBA 0-99 on D3 and LBA 12000-12099 on D4. In each case the lowest (relative) LBA is still 0 and the highest (relative) LBA is still 99. In other words, LBA 0-10 on D1 is considered to be fully overlapping with LBA 12000-12009 on D4.

The buffer size is then set to be equal to the difference (step s43) and the buffer is filled with zeroes (step s44). During the step of reading old data from the disks to the buffers, the data is written to the location in the buffer that corresponds to the location on the disk (step s45). For example, where the minimum LBA is 20 and the maximum LBA is 49, giving a buffer size of 30, the data in blocks 40 to 49 for one chunk is written to the third segment of the buffer and the first and second segments covering blocks 20 to 39 are left blank.

Recovery Procedures

In one example of the invention, the RMW_variant procedure according to the invention is used when all data drives and parity drive are present and operating correctly. If they are not, the system reverts to the conventional RMW method, to simplify recovery and reconstruction of data. Further, if there are any errors during the Read phase of the RMW_variant procedure, the system reverts to the conventional RMW method. For data integrity, a data structure is maintained that describes the intermediate parity value Pi based on D1, D3 and the unchanged ranges. This may assist with data recovery in the event of an array crash or drive errors. For example, the intermediate parity may contain holes if D1' and D3' do not overlap or if they do overlap. The additional data structures help the array to identify whether an RMW_Variant or a conventional RMW operation was being performed at the time of failure. Recovery for RMW_Variant and conventional RMW could then be processed differently.

The RMW_variant procedure can also keep pointers back to the cache addresses where the data resides. This makes recovery simpler because the new parity information can be calculated using the intermediate parity information and any combination of the new data. If the array resets in the middle of the Write phase, the write operations can be re-tried. For data that cannot be written, for example if a drive is missing or failed, the data can be marked out of sync and/or it can be failed back to cache and continue to be held in the cache.

In the conventional RMW procedure, if the array resets any time after calculating the intermediate parity information, the stripe can be restored to a consistent state during power-up. For example, the intermediate parity information is written to the data chunk and zero is written to the parity chunk, or vice versa. The failed writes (D1' and P') can then be re-tried on the stripe.

The writing of new parity information P' and new data D1' alter the contents of the disk stripe, so that recovery is important when a failure occurs in either of these two steps.

Three error conditions are possible while executing the writing of D1' and P' in the conventional procedure, as detailed below:

Error 1: Write P' Fails and Write D1' Succeeds

In this event, the RMW operation is marked as a success and the parity chunk is marked as out of sync. When further writes happen, the parity chunk can be written or a data rebuild procedure relocates all the data to another stripe and recalculates a new parity.

Error 2: Write P' Succeeds and Write D1' Fails

The RMW operation is again marked as a success, and the data chunk is marked as out of sync. The data can be reconstructed whenever needed using all of the other disk chunks. When further writes happen, the data chunk can be written or the rebuild procedure will relocate all the data to another stripe and reconstruct the failed data.

Error 3: Write P' Fails and Write D1' Fails

The RMW operation is marked as a failure and the disk stripe is in a data loss condition.

In contrast, the following takes place in the RMW_variant procedure according to an embodiment of the invention.

As shown in FIGS. 6, 7 and 8, the RMW_variant procedure has the following basic steps:
 1. Receive new data D1', D3';
 2. Read old data D1;
 3. Read old data D3;
 4. Read old parity P;
 5. Calculate intermediate parity Pi;
 6. Calculate new parity P'.

The above steps are non-destructive in the sense that they do not alter the contents of the disk stripe. If any one of the reads in steps 2, 3 or 4 fail, then the RMW_variant can be restarted. If two or more fail, then the stripe is already in a data loss condition.

If the array resets anytime after calculating the intermediate parity (step 5), then the stripe can be brought to a consistent state during power up, by writing the intermediate parity to the parity chunk and zero to the data chunks, as in the conventional case.

Once the stripe is made consistent, the failed writes can be retried:
 7. write new data D1';
 8. write new data D3';
 9. write new parity P'.

The above 3 steps alter the contents of the disk stripe, so recovery is important when a failure occurs in any of these steps. Seven error conditions are possible while executing the above three steps:

Error 1: Write D1' Fails, Write D3'Succeeds and Write P' Succeeds

The RMW operation is deemed a success. Chunk D1' is marked as out of sync. When further writes happen, the D1 chunk can be written or the rebuild procedure will relocate all data to another stripe and reconstruct D1.

Error 2: Write D1' Fails, Write D3'Fails and Write P' Succeeds

The RMW operation is deemed a failure. The disk stripe is in a data loss condition.

Error 3: Write D1' Fails, Write D3'Succeeds and Write P' Fails

The RMW operation is deemed a failure. The disk stripe is in a data loss condition.

Error 4: Write D1' Fails, Write D3'Fails and Write P' Fails

The RMW operation is deemed a failure. The disk stripe is in a data loss condition.

Error 5: Write D1' Succeeds, Write D3'Fails and Write P' Fails

The RMW operation is deemed a failure. The disk stripe is in a data loss condition.

Error 6: Write D1' Succeeds, Write D3'Fails and Write P' Succeeds

The RMW operation is deemed a success. Chunk D3' is marked as out of sync. When further writes happen, the D3 chunk can be written or the rebuild procedure will relocate all data to another stripe and reconstruct D1.

Error 7: Write D1' Succeeds, Write D3'Succeeds and Write P' Fails

The RMW operation is deemed a success. The parity chunk P' is marked as out of sync. When further writes happen, the parity chunk can be written or the rebuild procedure will relocate all data to another stripe and recalculate the parity.

The invention claimed is:

1. A method of writing data to an array of hard disks in a RAID 5 configuration in which data is arranged in a plurality of data stripes, the method comprising:
    grouping the data to be written such that each group contains items of data that are together writeable to respective ones of the data stripes, wherein each group is determined by a destination of an item of data with respect to a logical block address within a destination data chunk;
    determining a range of logical block addresses for at least two items of data;
    setting a temporary buffer to a size that corresponds to the determined range; and
    writing the at least two items of data together to one of the plurality of data stripes.

2. The method according to claim 1, wherein the step of writing the at least two items together comprises writing them simultaneously.

3. The method according to claim 1, wherein the method further comprises:
    reading old data from a selected data stripe;
    reading old parity information from the data stripe;
    performing an exclusive or (XOR) operation on the old data and the old parity information to determine intermediate parity information;
    performing an exclusive or (XOR) operation on the intermediate parity information and the data to be written to determine new parity information; and
    writing the data to be written and the new parity information together to the selected data stripe.

4. The method according to claim 1, wherein the method comprises a first stage in which old data and parity information are read, a second stage in which new parity information is calculated and a third stage after the first and second stages in which the items of data to be written and the new parity information are written to a selected data stripe without an intervening read operation.

5. The method according to claim 1, wherein writeable groups include data items destined for entirely overlapping logical block addresses, partially overlapping logical block addresses or non-overlapping logical block addresses in the disk array.

6. The method according to claim 1, wherein the step of determining a range of logical block addresses comprises determining a range for each disk chunk relative to the start of the logical block address range for the respective disk chunk.

7. The method according to claim 1, comprising filling the buffer with zeroes.

8. The method according to claim 1, further comprising reading old data into the buffer in a location that is dependent on the location of the data on the disk.

9. The method according to claim 8, comprising reading the old data from the lowest logical block address to the highest logical block address into a buffer.

10. The method according to claim 9, comprising storing the data to be written into the buffer into which the old data was read, to facilitate writing of the data to be written in a single operation.

11. The method according to claim 1, wherein the data items to be written to the disk array are to be written to the whole of a disk stripe, the method comprising reading old data items that are to remain unchanged, including the old data items in the data items to be written and performing a full stripe write.

12. The method according to claim 1, comprising switching to another method of writing the data in the event of an error, wherein the other method comprises writing items of data to the disks one at a time.

13. A method of writing data to an array of hard disks in a RAID 5 configuration in which data is arranged in a plurality of data stripes, the method comprising:
    preparing to write at least two items of data together to one of the plurality of data stripes, wherein the data to be written is grouped and each of the groups contains items of data that are together writeable to respective data stripes, and wherein each of the groups is determined by a destination of an item of data with respect to a logical block address within a destination data chunk; and
    determining a degree of separation of logical block addresses for the at least two items of data, and in the event that the degree of separation indicates that the logical block addresses are significantly separated, preventing the at least two items of data from being written together.

14. An apparatus for writing data to an array of hard disks in a RAID 5 configuration in which data is arranged in a plurality of data stripes, the apparatus comprising:
    a processor;
    a memory coupled to the processor and comprising code executable by the processor to write at least two items of data together to one of the plurality of data stripes; and
    a selector comprising code stored on the memory and executable by the processor to:
        group data into groups that are writeable to the data stripes, wherein each group is determined by a destination of an item of data with respect to a logical block address within a destination data chunk;
        determine a range of logical block addresses for the at least two items of data: and
        set a temporary buffer to a size that corresponds to the determined range.

15. The apparatus of claim 14, wherein the selector determines a degree of separation of logical block addresses for the at least two items of data, and in the event that the degree of separation indicates that the logical block addresses are significantly separated, prevents the data items from being written together.

16. The apparatus according to claim 14, wherein the apparatus is configured to fill the buffer with zeroes.

17. The apparatus according to claim 14, wherein the apparatus is configured to read old data into the buffer in a location that is dependent on the location of the data on the disk.

18. The apparatus according to claim 17, wherein the apparatus is configured to read the old data from a lowest logical block address to a highest logical block address into the buffer.

19. The apparatus according to claim 17, wherein the apparatus is configured to store the data to be written into the buffer into which the old data was read, to facilitate writing of the data to be written in a single operation.

* * * * *